(12) United States Patent
Hachikian

(10) Patent No.: US 7,608,672 B2
(45) Date of Patent: Oct. 27, 2009

(54) INFILTRANT SYSTEM FOR RAPID PROTOTYPING PROCESS

(75) Inventor: Zakar Raffi Hachikian, Belmont, MA (US)

(73) Assignee: Illinois Tool Works Inc., Glenview, IL (US)

( * ) Notice: Subject to any disclaimer, the term of this patent is extended or adjusted under 35 U.S.C. 154(b) by 792 days.

(21) Appl. No.: 10/778,008

(22) Filed: Feb. 12, 2004

(65) Prior Publication Data

US 2005/0179167 A1     Aug. 18, 2005

(51) Int. Cl.
*C08L 63/00* (2006.01)
*B32B 27/38* (2006.01)

(52) U.S. Cl. .................. 525/524; 523/400; 525/523

(58) Field of Classification Search ............ None
See application file for complete search history.

(56) References Cited

U.S. PATENT DOCUMENTS

| | | | |
|---|---|---|---|
| 3,980,604 A * | 9/1976 | Whiting et al. ............. 523/401 |
| 4,221,890 A | 9/1980 | Dimmick |
| 4,327,143 A * | 4/1982 | Alvino et al. ............... 442/180 |
| 4,480,082 A * | 10/1984 | McLean et al. ............. 528/103 |
| 4,507,363 A * | 3/1985 | Chow et al. ................. 428/418 |
| 4,916,020 A * | 4/1990 | Golding et al. ............. 428/421 |
| 5,204,055 A | 4/1993 | Sachs et al. |
| 5,340,656 A | 8/1994 | Sachs et al. |
| 5,387,380 A | 2/1995 | Cima et al. |
| 5,660,621 A | 8/1997 | Bredt |
| 5,688,905 A * | 11/1997 | Walker ....................... 528/332 |
| 5,749,041 A | 5/1998 | Lakshminarayan et al. |
| 5,851,465 A | 12/1998 | Bredt |
| 5,902,441 A | 5/1999 | Bredt et al. |
| 6,007,318 A | 12/1999 | Russell et al. |
| 6,068,885 A * | 5/2000 | Hartman et al. ............. 427/386 |
| 6,127,508 A | 10/2000 | Corley et al. |
| 6,375,874 B1 | 4/2002 | Russell et al. |
| 6,416,850 B1 | 7/2002 | Bredt et al. |
| 6,610,429 B2 | 8/2003 | Bredt et al. |
| 2002/0008333 A1 | 1/2002 | Napadensky |

OTHER PUBLICATIONS

Declaration of Zakar R. Hachikian dated Aug. 22, 2007.

* cited by examiner

*Primary Examiner*—Michael J Feely
(74) *Attorney, Agent, or Firm*—Dinsmore & Shohl LLP

(57) ABSTRACT

An infiltrant system for rapid prototyping processes. The infiltrant system generally includes a resin component and a hardener component. The resin component typically includes an epoxy resin, and a diluent. The hardener component typically includes an amine, optionally an amide, and optionally a catalyst. High strength infiltrant systems, flexible infiltrant systems, and a method for infiltrating a part are also described.

55 Claims, No Drawings

INFILTRANT SYSTEM FOR RAPID PROTOTYPING PROCESS

BACKGROUND OF THE INVENTION

This invention relates generally to rapid prototyping processes, and more particularly to an infiltrant system to be used for a part made by a rapid prototyping process, and a method for applying the infiltrant system to a part.

The conventional machining of prototype parts or production of cast or molded parts by hard or soft tooling techniques can take weeks and even months depending on the complexity of the part. It is an expensive and time-consuming process, and if changes need to be made, the mold may be useless.

Rapid prototyping was developed so that prototype parts could be made quickly, easily, and less expensively. There are two basic methods of rapid prototyping: a selective laser sintering process and liquid binder three dimensional printing process. Both use a layering technique to build a three-dimensional article. Thin cross-sections of the article are formed in successive layers. The particles in the layer are bonded together at the same time the cross-sectional layers are bonded together. Both processes allow parts to be made directly from computer-generated design data, and the parts can have complex cross-sections.

In selective laser sintering, a thin layer of powdered material is spread on a flat surface with a counter-roller. A laser is applied to the layer of powdered material in a predetermined pattern. The laser fuses the powder together. Additional layers of powdered material are applied and fused with the laser.

In the liquid binder three dimensional printing process, a layer of powdered material is applied to a surface with a counter-roller. A liquid or colloidal binder is applied to the layer of powder with an ink-jet printhead. The binder coats the powder and hardens, bonding the powder in that layer together and bonding the layers together. The process is repeated until the desired shape is obtained. When the part is taken out of the printer, it is fragile, and it does not have much cohesive strength. The part has to be reinforced and strengthened with an infiltrant system in order to make it functional. The infiltrant may fill in any pores in the part, improving the surface finish, and making it more impervious to water and other solvents. Known infiltrant materials include wax, varnish, lacquer, cyanoacrylate, polyurethane, and epoxy. The infiltrated part can then be used to assess the performance of the design.

Still, there is a need for improved infiltrant systems for rapid prototyping processes.

SUMMARY OF THE INVENTION

The present invention meets this need by providing an improved infiltrant system and method for applying the infiltrant system to a part. The infiltrant system generally includes a resin component and a hardener component. The resin component typically includes an epoxy resin, and a diluent. The hardener component typically includes an amine, optionally an amide, and optionally a catalyst.

In one embodiment, the infiltrant system is a high strength infiltrant system. The high strength infiltrant system generally includes a resin component and a hardener component. The resin component typically includes an epoxy resin, and a diluent. The hardener component typically includes an amine, an amide, and optionally a catalyst.

In another embodiment, the infiltrant system is a flexible infiltrant system. The flexible infiltrant system generally includes a resin component and a hardener component. The resin component typically includes an epoxy resin, and a diluent. The hardener component typically includes an amine, and optionally an amide.

DETAILED DESCRIPTION OF THE INVENTION

The infiltrant system generally includes a resin component and a hardener component. The resin component typically includes an epoxy resin, and a diluent. The hardener component typically includes an amine, optionally an amide, and optionally a catalyst.

In the resin component, suitable epoxy resins include, but are not limited to, bisphenol A, bisphenol F, or combinations thereof. Suitable diluents include, but are not limited to, reactive diluents, nonreactive diluents, or combinations thereof. Suitable reactive diluents include, but are not limited to, difunctional reactive diluents, monofunctional reactive diluents, or combinations thereof. Suitable reactive diluents include, but are not limited to, diglycidyl ether, glycidyl ether, or combinations thereof. A suitable diglycidyl ether is neopentyl glycol diglycidyl ether.

For the hardener component, suitable amines include, but are not limited to, unmodified aliphatic amines, modified aliphatic amines, unmodified cycloaliphatic amines, modified cycloaliphatic amines, unmodified amidoamines, modified amidoamines, or combinations thereof. One suitable amine is an unmodified aliphatic amine, such as aminoethylpiperazine. Another suitable amine is a polyamine, such as polyoxypropyleneamine base polyamine. Another suitable amine is an unmodified aliphatic amine such as a diethylene glycol di(aminopropyl) ether base unmodified aliphatic amine. Combinations of amines are also suitable, such as a mixture of a polyoxypropyleneamine base polyamine and a diethylene glycol di(aminopropyl) ether base unmodified aliphatic amine.

Suitable amides for the hardener component include, but are not limited to, modified amidoamines, or unmodified amidoamines. Suitable amides are unmodified amide/imidazoline and modified amide/imidazoline. Mixtures of polyamides are also suitable.

Suitable catalysts include, but are not limited to, tertiary amines and benzyl alcohol.

The infiltrant system is made by mixing the materials in the resin component together. The materials in the hardener component are mixed together. The resin component and the hardener component are stored separately. They are mixed together before being applied to the part. The components react and the infiltrant system cures, providing a part with the desired characteristics.

One desirable infiltrant system is a high strength infiltrant system. The high strength infiltrant is designed to provide superior wicking and penetration properties. It has high tensile strength and durability. The high strength infiltrant generally has a low viscosity, typically less than about 150 cps mixed viscosity. Desirably, it should have a pot life of at least 30 minutes.

The high strength infiltrant system generally includes a resin component and a hardener component. The resin component for the high strength infiltrant system typically includes about 50% to about 90% by weight of resin component of an epoxy resin, typically about 70% to about 85%.

Suitable epoxy resins include, but are not limited to, bisphenol A, bisphenol F, or combinations thereof. A low viscosity epoxy resin is a desirable. The use of a low viscosity epoxy resin allows the use of less diluent. High levels of diluent can have an adverse effect on the mechanical properties of the cured material. In addition, lower viscosity allows the infiltrant to penetrate faster and deeper into the printed material. One suitable epoxy resin is a bisphenol F resin with a viscosity of about 2,500 to about 4,500 cps. It is available from Resolution Polymers, Houston, Tex., under the designation Epon 862. Higher viscosity resins can also be used, such as bisphenol A resin with a viscosity of about 11,000 to about 13,000 cps. It is available under the designation Epon 828. Equivalent epoxy resins can be obtained from other manufacturers. Prediluted resins can also be used, such as Epon 815, which is a mixture of Epon 828 (bisphenol A) and Epodil 841 (glycidyl ether).

The resin component for the high strength infiltrant system also includes a diluent. Diluents are used to reduce the viscosity of the compounded product. However, they can adversely affect the properties of the cured and uncured material. Suitable diluents include, but are not limited to, reactive diluents, nonreactive diluents, or combinations thereof. Suitable reactive diluents include, but are not limited to, difunctional reactive diluents, monofunctional reactive diluents, or combinations thereof. Difunctional diluents minimize the adverse effects of having large amounts of diluents in the system because they do not terminate the polymerization reaction due to the difunctional reactivity. Monofunctional diluents have a larger adverse effect on physical properties than difunctional diluents because they terminate the polymerization reaction. Therefore, it is desirable to keep the use of monofunctional diluents as low as possible to minimize the negative effects.

One suitable difunctional diluent is a diglycidyl ether, such as neopentyl glycol diglycidyl ether. Diglycidyl ether is a desirable diluent because it has a minimal negative effect on the reactivity of the uncured material and the physical properties of the cured material. Neopentyl glycol diglycidyl ether is available from Air Products, Allentown, Pa. under the designation Epodil 749. A suitable monofunctional diluent is a glycidyl ether. Glycidyl ether provides good viscosity reduction with good retention of overall properties. Glycidyl ether is available from Air Products under the designation Epodil 741.

Any glycidyl or diglycidyl ether type diluents can be used, although the performance may not be as good as with Epodil 741 and Epodil 749. Equivalent diluents, including but not limited to, diglycidyl ethers and glycidyl ethers, can be obtained from other manufacturers.

Nonreactive diluents can also be used, including, but not limited to benzyl alcohol.

The diluent is generally present in an amount of about 10% to about 50% by weight of resin component, typically about 15% to about 30%. Desirably, a combination of diluents is used. A difunctional diluent may be included in an amount of about 5% to about 30% by weight of resin component, typically about 10% to about 20%. A monofunctional diluent may be used in an amount of about 5% to about 20% by weight of resin component, typically about 5% to about 10%.

The hardener component for the high strength infiltrant system includes an amine. Suitable amines include, but are not limited to, unmodified and modified aliphatic amines, unmodified and modified cycloaliphatic amines, unmodified and modified amidoamines, or combinations thereof. One suitable unmodified aliphatic amine is aminoethyl-piperazine. It provides rapid cure at room temperature, as well as high strength and impact resistance, especially after post-cure at elevated temperatures. Some unmodified aliphatic amines are very brittle and stiff after curing, which is undesirable. Some unmodified and modified aliphatic amines, unmodified and modified cycloaliphatic amines, or unmodified and modified amidoamines may result in lower physical properties, higher viscosity, and lower wetting and penetration by the resulting infiltrant composition. The amine should be selected to provide adequate strength and impact resistance, and good wetting and penetration.

The amine is generally present in an amount of about 20% to about 80% by weight of hardener component, typically about 30% to about 60%.

The hardener component for the high strength infiltrant system also includes an amide. Desirably, the amide is free of plasticizers, has a low viscosity, and has good wetting and penetration properties. Using an amide without a plasticizer helps to obtain maximum physical properties in the cured material. Suitable amides include, but are not limited to, modified and unmodified amidoamines. One suitable modified amidoamine is a modified amide/imidazoline. Ancamide 2443 available from Air Products, Allentown, Pa., is a suitable amide. It is a modified amide/imidazoline which is plasticizer free, has a viscosity of about 30 cps, and has excellent wetting and penetrating properties.

The amide is generally present in an amount of about 20% to about 70% by weight of hardener component, typically about 40% to about 60%.

The hardener component for the high strength infiltrant system optionally contains a catalyst. Suitable catalysts include, but are not limited to, tertiary amines and benzyl alcohol. The catalyst is a performance promoter, but is not necessary. It helps to cure the system faster, as well as enhancing the wetting and penetration capability of the product. Suitable tertiary amines include, but are not limited to, Ancamine K-54, available from Air Products, Allentown, Pa., and dimethylaminomethylphenol, such as DMP-10 available from Rohm & Haas, Philadelphia, Pa.

The catalyst is generally present in an amount of 0 to about 10% by weight of hardener component, typically about 3% to about 7%.

Typical formulations for the high strength infiltrant of the present invention are as follows.

|  | Range (wt %) | Range (wt %) |
| --- | --- | --- |
| Resin Component | | |
| Epoxy Resin | 50-90 | 70-85 |
| Reactive Diluent (diglycidyl ether) | 5-30 | 10-20 |
| Reactive Diluent (glycidyl ether) | 5-20 | 5-10 |
| Hardener Component | | |
| Amine | 20-80 | 30-60 |
| Amide | 20-70 | 40-60 |
| Catalyst | 0-10 | 3-7 |

EXAMPLE 1

A high strength infiltrant was made according to the following formulation:

| Tradename | Ingredient | Weight % |
| --- | --- | --- |
| Resin Component | | |
| Epon 862 | Bisphenol F Epoxy resin | 79.3 |
| Epodil 749 | Neopentyl Glycol Diglycidyl Ether | 15 |
| Epodil 741 | Butyl Glycidyl Ether | 5.7 |

-continued

| Tradename | Ingredient | Weight % |
|---|---|---|
| Hardener Component | | |
| Aminoethyl-piperazine | Unmodified Aliphatic Amine | 45 |
| Ancamide 2443 | Amidoamine | 50 |
| Ancamine K-54 | Accelerator/Catalyst | 5 |

Parts made using the high strength infiltrant system of the present invention were tested and compared to parts made using an existing epoxy infiltrant system (both cured on Z Corp.'s zp100 powder system). The results are shown in Table 1.

TABLE 1

Physical Property Comparison Between High Strength Infiltrant and Existing Infiltrant System

| Property | High Strength Infiltrant | Existing Epoxy Infiltrant |
|---|---|---|
| Tensile Strength (psi) | 1,797 | 1,332 |
| Tensile Modulus (psi) | 255,077 | 114,000 |
| Flexural Strength (psi) | 5,055 | 2,888 |
| Flexural Modulus (psi) | 930,005 | 531,800 |

The high strength infiltrant of the present invention can improve one or more of the physical properties of a part (tensile strength, tensile modulus, flexural strength, flexural modulus) by at least about 30% as compared to the existing epoxy infiltrant. One or more properties can be improved by at least about 50%, or at least about 75%, or at least about 100%. High tensile strength and tensile modulus are important for a high strength infiltrant.

Another desirable infiltrant system is a flexible infiltrant system. The flexible infiltrant will allow flexible parts to be made using the three dimensional printing technology. One advantage of being able to make a flexible prototype is that parts can be made with a snap fit, just as the actual plastic parts would have. Having parts with identical properties to the actual parts to be made will allow the customers to assemble and disassemble the final parts. The flexible infiltrant system can be used to make prototype buckles and snap fit parts like phone housings.

The flexible infiltrant system should have low viscosity, good wicking and penetration, and flexibility to allow snap fit connections.

The flexible infiltrant system generally includes a resin component and a hardener component. The resin component generally includes an epoxy resin and a diluent. The hardener component generally includes an amine and optionally an amide.

The resin component for the flexible infiltrant system generally includes about 50% to about 90% by weight of resin component of an epoxy resin, typically about 70% to about 85%. The diluent is generally present in an amount of about 10% to about 50% by weight of resin component, typically about 15% to about 30%. Desirably, a combination of diluents is used. A difunctional diluent may be included in an amount of about 5% to about 30% by weight of resin component, typically about 10% to about 20%. A monofunctional diluent may be used in an amount of about 5% to about 20% by weight of resin component, typically about 5% to about 10%.

The resin component for the flexible infiltrant system can use the same types of epoxy resins and diluents as the resin component for the high strength infiltrant system.

The hardener component for the flexible infiltrant system includes an amine. Desirably, the amine should have flexibility, resiliency, toughness, and impact resistance. It should desirably have a low viscosity, and good wetting and penetration. Suitable amines include, but are not limited to, unmodified and modified aliphatic amines, unmodified and modified cycloaliphatic amines, unmodified and modified amidoamines, or combinations thereof.

The amine is generally present in an amount of about 30% to about 90% by weight of hardener component, typically about 65% to about 80%.

One suitable aliphatic amine is a polyoxypropyleneamine base polyamine. The compound has flexibility, toughness, and impact resistance. It also has a low viscosity of about 9 cps which allows it to wet the surface and penetrate through the pores of the printed part. Jeffamine D-230, available from Huntsman, Salt Lake City, Utah, is an example of a suitable polyamine. Other suitable polyamines having similar properties are other amines in the Jeffamine family, such as Jeffamine 400 and EDR-148.

Another suitable aliphatic amine is a diethylene glycol di(aminopropyl) ether base unmodified aliphatic amine. This unmodified amine has good toughness, resiliency, and impact resistance. It has a viscosity of about 10 cps, so it has good wetting and penetration. Diethylene glycol di(aminopropyl) ether base unmodified aliphatic amine is available from Air Products under the designation Ancamine 1922A.

Typically, a combination of amines is used, such as a polyamine and an aliphatic amine. For example, a combination of polyoxypropyleneamine base polyamine and diethylene glycol di(aminopropyl) ether base unmodified aliphatic amine can be used. One amine can be present in an amount of about 20% to about 80% by weight of hardener component, typically about 35% to about 60%. The other amine can present in an amount of about 10% to about 40% by weight of hardener component, typically about 20% to about 30%.

The hardener component for the flexible infiltrant system includes an amide. Suitable amides include, but are not limited to, mixture of polyamides. The amide should provide an elongation of at least about 50%, and typically at least about 75%, or at least about 100%. A suitable polyamide mixture is available from Air Products under the designation Ancamide 910.

The amide is generally present in an amount of about 10% to about 40% by weight of hardener component, typically about 20% to about 35%.

In some cases, rather than an amide, a reactive component, such as a modified aliphatic amine could be used. In this case, the hardener component would include a combination of a polyamine and an aliphatic amine, such as polyoxypropyleneamine and diethylene glycol di(aminopropyl) ether base unmodified aliphatic amine. The polyamine would typically be present in an amount of about 20 percent to about 80 percent by weight of hardener component and the aliphatic amine would be present in an amount of about 20 percent to about 40 percent by weight of hardener component.

A non-reactive flexibilizer could be used, but it will result in decreased strength in the cured product.

A flexible infiltrant of the present invention can be made using the following typical formulations.

|  | Range (wt %) | Range (wt %) |
| --- | --- | --- |
| Resin Component | | |
| Epoxy Resin | 50-90 | 70-85 |
| Reactive Diluent (diglycidyl ether) | 5-30 | 10-20 |
| Reactive Diluent (glycidyl ether) | 5-20 | 5-10 |
| Hardener Component | | |
| Aliphatic Amine | 20-80 | 35-60 |
| Aliphatic Amine | 10-40 | 20-30 |
| Polyamide | 10-40 | 20-35 |

EXAMPLE 2

A flexible infiltrant was made according to the following formulation:

| Tradename | Ingredient | Weight % |
| --- | --- | --- |
| Resin Component | | |
| Epon 862 | Bisphenol F Epoxy resin | 79.3 |
| Epodil 749 | Neopentyl Glycol Diglycidyl Ether | 15 |
| Epodil 741 | Butyl Glycidyl Ether | 5.7 |
| Hardener Component | | |
| Jeffamine D-230 | Polyoxypropyleneamine base polyamine | 42.9 |
| Ancamine 1922A | Diethylene glycol di(aminopropyl) ether base unmodified aliphatic amine | 28.55 |
| Ancamide 910 | Polyamide Mixture | 28.55 |

Parts were made using the flexible infiltrant system of the present invention with Z Corp.'s zp250 powder system. The cured system provides a flexible and toughened product, allowing the parts to snap in and out hundreds of times without breaking. Table 2 shows representative properties for parts made using the flexible infiltrant system.

TABLE 2

Properties for Flexible Infiltrant System

| Property | Flexible Infiltrant System |
| --- | --- |
| Tensile Strength (psi) | 1,531 |
| Tensile Modulus (psi) | 178,151 |
| Flexural Strength (psi) | 3,889 |
| Flexural Modulus (psi) | 195,688 |

The important properties for the flexible infiltrant are the flexural strength and the flexural modulus. These provide the flexibility necessary for snap fit type connections.

While certain representative embodiments and details have been shown for purposes of illustrating the invention, it will be apparent to those skilled in the art that various changes in the compositions and methods disclosed herein may be made without departing from the scope of the invention, which is defined in the appended claims.

What is claimed is:

1. A two component high strength infiltrant system comprising:
   a resin component comprising:
      about 70 to about 90% by weight of resin component of an epoxy resin; and
      about 10 to about 30% by weight of resin component of a diluent; and
   a hardener component comprising:
      an amine selected from unmodified aliphatic amines, modified aliphatic amines, unmodified cycloaliphatic amines, modified cycloaliphatic amines, or combinations thereof;
      an amide selected from modified amidoamines, unmodified amidoamines, or combinations thereof; and
      optionally a catalyst;
   wherein the infiltrant system has a mixed viscosity of less than 150 cps.

2. The infiltrant system of claim 1 wherein the epoxy resin is selected from bisphenol A epoxy resin, bisphenol F epoxy resin, or combinations thereof.

3. The infiltrant system of claim 1 wherein the diluent is selected from reactive diluents, nonreactive diluents, or combinations thereof.

4. The infiltrant system of claim 3 wherein the diluent is a reactive diluent comprising a combination of difunctional reactive diluents, and monofunctional reactive diluents.

5. The infiltrant system of claim 4 wherein the difunctional reactive diluent is diglycidyl ether, and the monofunctional reactive diluent is glycidyl ether.

6. The infiltrant system of claim 5 wherein the diglycidyl ether is neopentyl glycol diglycidyl ether.

7. The infiltrant system of claim 1 wherein the amine is an unmodified aliphatic amine.

8. The infiltrant system of claim 7 the unmodified aliphatic amine is aminoethyl-piperazine.

9. The infiltrant system of claim 1 wherein the amide is an unmodified amide/imidazoline or a modified amide/imidazoline.

10. The infiltrant system of claim 1 wherein the catalyst is selected from tertiary amines or benzyl alcohol.

11. The infiltrant system of claim 1 wherein the amine comprises a combination of a polyamine unmodified aliphatic amine and a second unmodified aliphatic amine.

12. The infiltrant system of claim 11 wherein the amine comprises a combination of polyoxypropyleneamine polyamine and diethylene glycol di(aminopropyl)ether base unmodified aliphatic amine.

13. A two component high strength infiltrant system comprising:
   a resin component comprising:
      about 70 to about 90% by weight of resin component of an epoxy resin; and
      about 10 to about 30% by weight of resin component of a diluent; and
   a hardener component comprising:
      about 20 to about 80% by weight of hardener component of an amine selected from unmodified aliphatic amines, modified aliphatic amines, unmodified cycloaliphatic amines, modified cycloaliphatic amines, or combinations thereof;
      about 20 to about 70% by weight of hardener component of an amide selected from unmodified amidoamines, modified amidoamines, or combinations thereof; and
      0 to about 10% by weight of hardener component of a catalyst;
   wherein the infiltrant system has a mixed viscosity of less than about 150 cps.

14. The infiltrant system of claim 13 wherein the epoxy resin is selected from bisphenol A epoxy resin, bisphenol F epoxy resin, or combinations thereof.

15. The infiltrant system of claim 13 wherein the epoxy resin is present in an amount of about 70 to about 85% by weight of resin component.

16. The infiltrant system of claim 13 wherein the diluent is present in an amount of about 15 to about 30% by weight of resin component.

17. The infiltrant system of claim 13 wherein the diluent is selected from reactive diluents, nonreactive diluents, or combinations.

18. The infiltrant system of claim 17 wherein the diluent is a reactive diluent comprising a combination of difunctional reactive diluents, and monofunctional reactive diluents.

19. The infiltrant system of claim 18 wherein the difunctional reactive diluent is diglycidyl ether, and the monofunctional reactive diluent is glycidyl ether.

20. The infiltrant system of claim 19 wherein the reactive diluent comprises a mixture of about 5 to about 20% by weight of resin component diglycidyl ether and about 5 to about 20% by weight of resin component glycidyl ether.

21. The infiltrant system of claim 20 wherein the reactive diluent comprises a mixture of about 10 to about 20% by weight of resin component diglycidyl ether and about 5 to about 10% by weight of resin component glycidyl ether.

22. The infiltrant system of claim 19 wherein the diglycidyl ether is neopentyl glycol diglycidyl ether.

23. The infiltrant system of claim 13 wherein the amine is an unmodified aliphatic amine.

24. The infiltrant system of claim 23 the unmodified aliphatic amine is aminoethyl-piperazine.

25. The infiltrant system of claim 13 wherein the amine is present in an amount of about 30 to about 60% by weight of hardener component.

26. The infiltrant system of claim 13 wherein the amide is a modified amide/imidazoline or an unmodified amide/imidazoline.

27. The infiltrant system of claim 13 wherein the amide is present in an amount of about 40 to about 60% by weight of hardener component.

28. The infiltrant system of claim 13 wherein the catalyst is selected from tertiary amines or benzyl alcohol.

29. The infiltrant system of claim 13 wherein the catalyst is present in an amount of about 3 to about 7% by weight of hardener component.

30. The infiltrant system of claim 13 wherein
the resin component comprises:
about 70 to about 90% by weight of resin component of the epoxy resin selected from bisphenol A epoxy resin, bisphenol F epoxy resin, or combinations thereof; and
about 10 to about 30% by weight of resin component of a reactive diluent selected from diglycidyl ether, glycidyl ether, or combinations thereof; and
the hardener component comprises:
about 20 to about 80% by weight of hardener component of an unmodified aliphatic amine;
about 20 to about 70% by weight of hardener component of a modified amidoamine, an unmodified amidoamine, or combinations thereof; and
0 to about 10% by weight of hardener component of a tertiary amine catalyst.

31. The infiltrant system of claim 30 wherein
the resin component comprises:
about 70 to about 85% by weight of resin component of bisphenol F epoxy resin; and
about 10 to about 20% by weight of resin component of the reactive diluent diglycidyl ether; about 5 to about 10% by weight of resin component of the reactive diluent glycidyl ether; and
the hardener component comprises:
about 30 to about 60% by weight of hardener component of aminoethyl-piperazine;
about 40 to about 60% by weight of hardener component of a modified amide/imidazoline or an unmodified amide/imidazoline; and
3 to about 7% by weight of hardener component of the tertiary amine catalyst.

32. A two component flexible infiltrant system comprising:
a resin component comprising:
about 70 to about 90% by weight of resin component of an epoxy resin; and
about 5 to about 20% by weight of resin component of a difunctional reactive diluent; and
about 5 to about 10% by weight of resin component of a monofunctional reactive diluent; and
a hardener component comprising:
about 30 to about 90% by weight of hardener component of an amine selected from unmodified aliphatic amines, modified aliphatic amines, unmodified cycloaliphatic amines, modified cycloaliphatic amines, or combinations thereof; and
about 10 to about 40% by weight of hardener component of an amide selected from polyamides and mixtures thereof.

33. The infiltrant system of claim 32 wherein the epoxy resin is selected from bisphenol A epoxy resin, bisphenol F epoxy resin, or combinations thereof.

34. The infiltrant system of claim 32 wherein the epoxy resin is present in an amount of about 70 to about 85% by weight of resin component.

35. The infiltrant system of claim 32 wherein the difunctional reactive diluent is diglycidyl ether, and the monofunctional reactive diluent is glycidyl ether.

36. The infiltrant system of claim 35 wherein the reactive diluent comprises a mixture of about 5 to about 20% by weight of resin component diglycidyl ether and about 5 to about 10% by weight of resin component glycidyl ether.

37. The infiltrant system of claim 36 wherein the reactive diluent comprises a mixture of about 10 to about 20% by weight of resin component diglycidyl ether and about 5 to about 10% by weight of resin component glycidyl ether.

38. The infiltrant system of claim 35 wherein the diglycidyl ether is neopentyl glycol diglycidyl ether.

39. The infiltrant system of claim 32 wherein the amine is a mixture of a polyamine unmodified aliphatic amine and a second unmodified aliphatic amine.

40. The infiltrant system of claim 39 wherein the amine is a mixture of about 20 to about 80% by weight of hardener component of the polyamine and about 10 to about 40% by weight of hardener component of the second unmodified aliphatic amine.

41. The infiltrant system of claim 40 wherein the amine is a mixture of about 35 to about 60% by weight of hardener component of the polyamine and about 20 to about 30% by weight of hardener component of the second unmodified aliphatic amine.

42. The infiltrant system of claim 39 wherein the polyamine is a polyoxypropyleneamine base polyamine.

43. The infiltrant system of claim 39 wherein the second unmodified aliphatic amine is a diethylene glycol di(aminopropyl)ether base unmodified aliphatic amine.

44. The infiltrant system of claim 39 wherein the amine is a mixture of a polyoxypropyleneamine base polyamine and a diethylene glycol di(aminopropyl)ether base unmodified aliphatic amine.

45. The infiltrant system of claim 39 wherein
the resin component comprises:
about 70 to about 90% by weight of resin component of an epoxy resin selected from bisphenol A epoxy resin, bisphenol F epoxy resin, or combinations thereof;
about 5 to about 20% by weight of resin component of a difunctional reactive diluent, wherein the difunctional reactive diluent is diglycidyl ether; and
about 5 to about 10% by weight of resin component of a monofunctional reactive diluent, wherein the monofunctional reactive diluent is glycidyl ether; and
a hardener component comprising:
about 20 to about 80% by weight of hardener component of the polyamine;
about 10 to about 40% by weight of hardener component of the second unmodified aliphatic amine; and
about 10 to about 40% by weight of hardener component of a mixture of polyamides.

46. The infiltrant system of claim 45 wherein
the resin component comprises:
about 70 to about 85% by weight of resin component of bisphenol F epoxy resin; and
about 10 to about 20% by weight of resin component of the reactive diluent diglycidyl ether;
about 5 to about 10% by weight of resin component of the reactive diluent glycidyl ether; and
a hardener component comprising:
about 35 to about 60% by weight of hardener component of a polyoxypropyleneamine base polyamine;
about 20 to about 30% by weight of hardener component of a diethylene glycol di(aminopropyl)ether base unmodified aliphatic amine; and
about 20 to about 35% by weight of hardener component of a mixture of polyamides.

47. The infiltrant system of claim 32 wherein the amide is present in an amount of about 20 to about 35% by weight of hardener component.

48. A two component flexible infiltrant system comprising:
a resin component comprising:
an epoxy resin; and
about 5 to about 30% by weight of resin component of a difunctional reactive diluent;
about 5 to about 10% by weight of resin component of a monofunctional reactive diluent; and
a hardener component comprising:
an amine selected from unmodified aliphatic amines, modified aliphatic amines, unmodified cycloaliphatic amines, modified cycloaliphatic amines, or combinations thereof and
an amide selected from polyamides and mixtures thereof.

49. The infiltrant system of claim 48 wherein the epoxy resin is selected from bisphenol A epoxy resin, bisphenol F epoxy resin, or combinations thereof.

50. The infiltrant system of claim 48 wherein the amine is an unmodified aliphatic amine.

51. The infiltrant system of claim 50 wherein the unmodified aliphatic amine is a polyamine.

52. The infiltrant system of claim 51 wherein the polyamine is a polyoxypropyleneamine base polyamine.

53. The infiltrant system of claim 50 wherein the unmodified aliphatic amine is a diethylene glycol di(aminopropyl) ether base unmodified aliphatic amine.

54. The infiltrant system of claim 50 wherein the unmodified aliphatic amine is a mixture of a polyoxypropyleneamine base polyamine and a diethylene glycol di(aminopropyl)ether base unmodified aliphatic amine.

55. The infiltrant system of claim 48 wherein the amide is a mixture of polyamides.

* * * * *

UNITED STATES PATENT AND TRADEMARK OFFICE
CERTIFICATE OF CORRECTION

PATENT NO. : 7,608,672 B2  Page 1 of 1
APPLICATION NO. : 10/778008
DATED : October 27, 2009
INVENTOR(S) : Zakar Raffi Hachikian It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1268 days.

Signed and Sealed this

Twelfth Day of October, 2010

David J. Kappos
*Director of the United States Patent and Trademark Office*